United States Patent [19]

Perbet et al.

[11] 4,385,807

[45] May 31, 1983

[54] VISUAL DISPLAY DEVICE WITH MEMORY AND TELEPHONE EXCHANGE INCORPORATING SUCH A DEVICE

[75] Inventors: Jean-Noel Perbet; Michel Hareng; Serge Le Berre, all of Paris, France

[73] Assignee: Thomson-CSF, Paris, France

[21] Appl. No.: 187,444

[22] Filed: Sep. 15, 1980

[30] Foreign Application Priority Data

Sep. 18, 1979 [FR] France ............... 79 23243

[51] Int. Cl.³ .............................................. G02F 1/13
[52] U.S. Cl. ............................ 350/350 S; 350/333; 350/346
[58] Field of Search ............... 350/330, 333, 350 S, 350/346

[56] References Cited

U.S. PATENT DOCUMENTS 3,718,382  2/1973  Wysocki et al. ............... 350/333 X
4,040,047  8/1977  Hareng et al. ............... 350/350 S X

OTHER PUBLICATIONS

Heidrich, P. F. et al., "Switching of Nematic Liquid Crystals by Surface Waves", *IBM Disclosure Bulletin*, vol. 15, No. 1, (Jun. 1972), pp. 165-167.

Bartolino, R. et al., "Ultrasonic Modulation of Light with a Liquid Crystal in the Smectic-A and Nematic Phases", *Journal of Applied Physics*, vol. 46, No. 5, (May 1975), pp. 1928-1933.

*Primary Examiner*—John K. Corbin
*Assistant Examiner*—Richard F. Gallivan
*Attorney, Agent, or Firm*—Cushman, Darby & Cushman

[57] ABSTRACT

A display device having a memory making it possible to display information supplied by electric signals and to maintain this display when the signals have disappeared. In a smectic liquid crystal display cell the two plates enclosing the liquid crystal layer can be moved apart by a piezoelectric wedge so as to make the crystal diffusive throughout. Parts of this crystal are then made transparent by applying thereto a reorientation electric field by means of a set of electrodes. The device is intended for use more particularly in telephone exchanges having a device for the display of digital data transmitted on a telephone line.

8 Claims, 2 Drawing Figures

VISUAL DISPLAY DEVICE WITH MEMORY AND TELEPHONE EXCHANGE INCORPORATING SUCH A DEVICE

BACKGROUND OF THE INVENTION

The present invention relates to a display device with a memory making it possible to enter or print out in a sensitive material symbols or pictures which are then observed either directly or by projecting on to a screen. These symbols or pictures remain entered in this material until an external action erases them. The invention also relates to display systems incorporating such a device.

It is known to construct display devices which use liquid crystals as the sensitive material. Such devices are more particularly described in the work entitled "Opto-electronique" by Georges Broussaud, and whose ISBN reference is 2-225 39 138-6.

In such a device it is known to use a smectic material previously brought into a phase where it is diffusive and to make it transparent by applying thereto a direct or alternating electrical field. Such a device is more particularly described in French patent application 74 20715 filed by the Applicant company on June 14th, 1974 and entitled "Black and White Image Reproduction Device using a Material having a Smectic Phase and Remote Transmission and Remote Reprography System utilizing this Device."

In this device the liquid crystal is made diffusive by a light source, whose beam is focused on the device so as to heat the liquid crystal. In the absence of an electric field when the latter cools it becomes diffusive, whereas when such a field is applied during cooling it becomes transparent to a greater or lesser extend depending on the field value applied. To obtain this light beam in practical constructions a laser, together with a system of electro-optical deflectors, are used. These members are cumbersome and costly and do not make it possible to obtain a display device which can be mass-produced.

BRIEF SUMMARY OF THE INVENTION

To obviate these disadvantages the invention proposes a display device with a memory of the type incorporating a smectic liquid crystal layer which can assume a transparent state under the action of an electrical field, first and second plates enclosing said layer, at least one first electrode supported by the face of the first plate in contact with the liquid crystal and at least one second electrode supported by the face of the second plate in contact with the liquid crystal and which, with the first electrode, makes it possible to subject part of the liquid crystal layer to an electrical reorientation field, wherein it also comprises means making it possible to momentarily modify the position of the first plate relative to the second in order to bring the liquid crystal into a uniform diffusive state.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
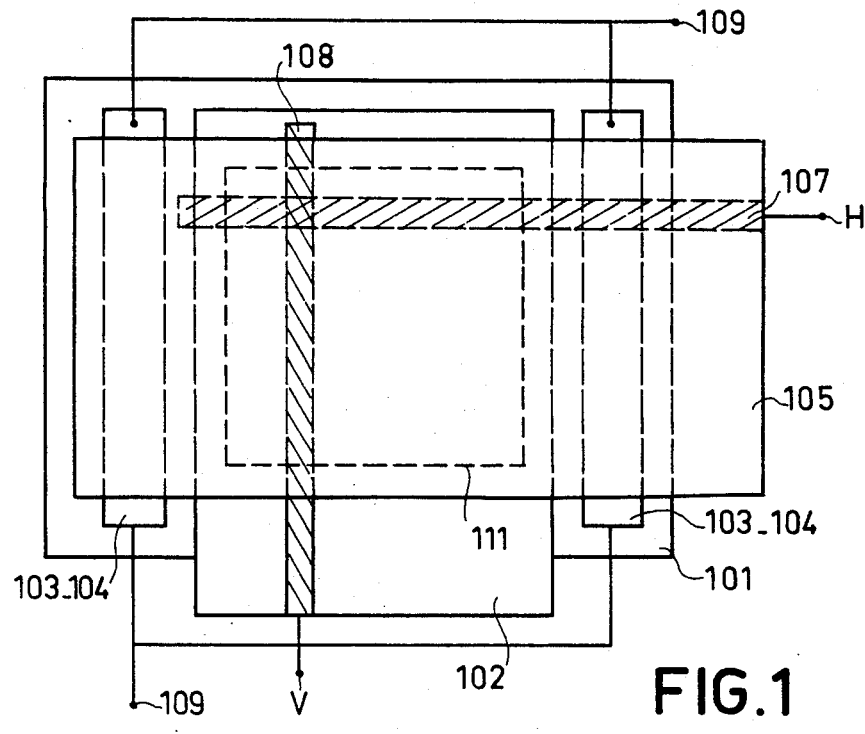
FIG. 1 a plan view of a visual display cell according to the invention.
Figure 2:
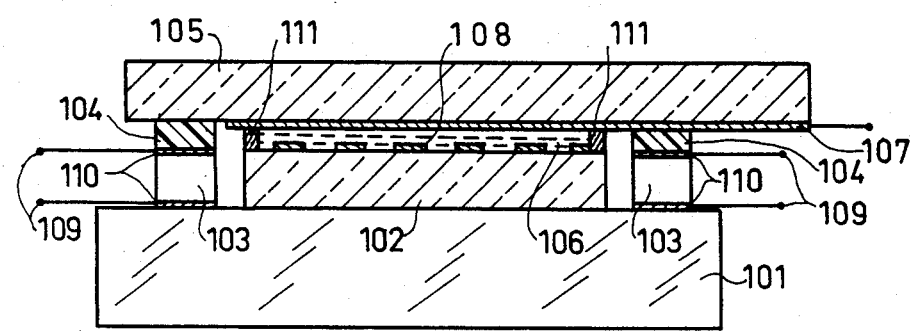
FIG. 2 a section through the cell of FIG. 1.

The device shown in FIGS. 1 and 2 comprises a glass plate 102 and two piezoelectric wedges 103 on a transparent substrate 101. This glass plate and these piezoelectric wedges are stuck to the substrate 101, for example by means of a cyanoacrylic glue. In order to obtain a clearly defined thickness of the liquid crystal layer described hereinafter, only the surfaces in contact with substrate 101 are polished before glueing, the other surfaces remaining in the original state. When the glueing has been performed the upper end of the plate and the wedges are ground, which brings the said ends into the same reference plane. The operation is finished by optical polishing.

A second glass plate 105 defines a space with the first plate 102, said space being filled with a liquid crystal layer 106. The thickness of the liquid crystal layer is determined by two wedges 104 resting on the piezoelectric wedges 103 and which support the second glass plate 105. These wedges 104 are, for example, cut from an ethylene glycol polyterephthalate sheet. The layer is defined at its edges by a flexible material ring, the material being for example silicone rubber.

A first system of parallel electrodes 107 is deposited on the lower face of plate 105. With a second system of electrodes 108 deposited on the upper face of plate 102 it defines a system of crossing points which can be individually addressed in accordance with a matrix addressing system.

These transparent electrodes are, for example, made from a mixed indium and tin oxide. FIG. 1 only shows a single electrode from each group or system in order to make the drawing more legible.

The liquid crystal layer 106 is formed from a liquid crystal maintained in a smectic state. The thickness of this layer is approximately a few microns. The liquid crystal is, for example 4,4'-cyanooctyl-biphenyl, known as COB.

The upper and lower surfaces of the piezoelectric surfaces 103 carry electrodes 110 which are connected to connections 109. By applying a voltage step to connections 109 it is possible to vary the thickness of wedges 103. This thickness variation of wedges 103 brings about the displacement of the second glass plate 105 via wedges 104. The thickness of the space between glass plates 102 and 105 consequently increases suddenly which, within the liquid crystal layer 106 creates pressure variations and whirling movements due to the fact that the liquid crystal tends to fill the supplementary space made available to it.

Under the action of the whirling movements and the pressure variations the homeotropic structure of the smectic liquid cannot be maintained and is organized into a highly diffusive state very similar to that known as a focal conic section structure. This state is stable and the slow return of plate 105 to its position on eliminating the voltage step applied to connections 105 does not change it. Thus, after the temporary application of a voltage step to electrodes 110 the liquid crystal between glass plates 105 and 102 has become diffusive throughout its volume. Thus, the complete device is erased and is ready for a further print-out.

In order to carry out this print-out a voltage is applied to electrodes 107 and 108 respectively by connections H and V, said voltage determining at the crossing points of the electrodes an electric field applied to the liquid crystal layer at this point.

Under the effect of the electric field the liquid crystal tends to reorient itself and resume a transparent structure. This is particularly the case in liquid crystals having a positive dielectric anisotropic, such as COB. These products, and in particular COB, usually have a reorientation threshhold permitting matrix addressing, like that used in the present construction. This addressing can be carried out in accordance with the standard V/3V procedure which, by applying in the rest state a voltage V to the vertical electrodes and a voltage 2V to the horizontal electrodes makes it possible to address a random point by applying to the corresponding vertical electrode a voltage 3V and to the corresponding horizontal electrode a zero voltage. The voltage V is selected so as to be below the reorientation threshold, but such that voltage 3V exceeds this threshold. This also permits a line by line entry by applying a zero voltage to the electrode corresponding to said line and whilst applying a group of voltages selected between the values V and 3V to the system of vertical electrodes corresponding to the columns, thus making it possible to represent all the points displayed on the completely addressed line.

The transparent phase obtained at the addressed point is stable in time, which also facilitates matrix addressing. Thus, the display device has an intrinsic memory and when the entry to be displayed has been effectively entered in the liquid crystal layer it remains there without any need for refreshing. Thus, the device only consumes electric power at the time of entry and erasure.

In the present embodiment the light source is below substrate 101 and the observer above plate 105, so that the device functions by transmission.

By using a reflective metal deposit, e.g. an aluminium layer for electrodes 108 the device will function by a light source positioned above glass plate 105 towards an observer positioned above said glass plate.

In a practical construction COB with a thickness of 20 microns is used. For this thickness and reorientation threshold is 20 volts and the diffusive structure is established for a rapid expansion of approximately 100 Angströms. The relative value of this expansion is sufficiently low that there is no risk of separation of liquid crystal layer with respect to the surface of the glass plates enclosing it. In the production of the piezoelectric wedges 103 a type P4-68 ceramic is used, whose thickness variation is 4.8 Angströms/volt/millimeter with a maximum voltage of 600 volts/millimeter. The expansion of 100 Angströms is consequently obtained with a voltage slightly above 100 volts, which is very compatible with the presently available transistors. The appearance of the diffusive structure and consequently the erasure is performed in less than one second.

When entry takes place in a line by line manner the response time is approximately a few dozen milliseconds. This speed is not very high but the intrinsic memory of the device makes it adequate.

This intrinsic memory and the possibility of using only a single information input at a relatively low speed in particular makes it possible to use such a device in a telephone terminal or exchange where it is necessary to supply digital data from a telephone line at a conventional speed of 1200 Bauds. Such an exchange makes it possible, for example, to display data corresponding to the remotely consulted telephone directory on the basis of the automatic telephone sender of the exchange.

The invention is not limited to transverse movements which tend to move the substrates away from the liquid crystal cell. It extends to all movements of substrates making it possible to break the homeotropic structure and in particular to lateral movements and to vibrations.

What is claimed is:

1. A display device with a memory comprising:
    a smectic liquid crystal layer which can assume a transparent state under the action of an electrical field;
    first and second plates enclosing said layer;
    at least one first electrode supported by the face of the first plate in contact with the liquid crystal and at least one second electrode supported by the face of the second plate in contact with the liquid crystal said electrodes subjecting part of the liquid crystal layer to an electrical reorientation field; and
    means for momentarily modifying the position of the first plate relative to the second in order to bring the liquid crystal into a uniform diffusive state.

2. A device according to claim 1, wherein the modifying means modifies the thickness of the liquid crystal layer.

3. A device according to claim 2, wherein the modifying means making it possible to vary the moves apart the two plates surrounding said layer.

4. A device according to claim 2, wherein the modifying means comprise at least one piezoelectric wedge provided with electrodes for applying a voltage for varying the wedge thickness.

5. A device according to claim 4, further comprising a substrate supporting the first plate and the piezoelectric wedge and at least one shim placed on the piezoelectric wedge and supporting the second plate, the thickness of the piezoelectric wedge being the same as that of the first plate.

6. A device according to claim 1, wherein the first plate supports a first system of linear, parallel electrodes including the first electrode and the second plate supports a second system of linear, parallel electrodes including the second electrode, said two systems of electrodes crossing one another to define a system of display points which can be addressed in matrix manner.

7. A device according to claim 1, wherein the electrodes and plates are transparent to permit a visual display by transmission.

8. A device according to claim 1, wherein the second plate and the second electrode are transparent and the first electrode is reflecting to permit a display across the second plate by reflection to the first electrode.

* * * * *